INVENTOR.
EUGENE LEONARD
BY S.C. Yuter
ATTORNEY

Sept. 23, 1958 E. LEONARD 2,853,559

SIGNAL TRANSFER SELECTOR

Filed May 3, 1954 4 Sheets-Sheet 2

INVENTOR.
EUGENE LEONARD
BY S.C. Yuter
ATTORNEY.

INVENTOR.
EUGENE LEONARD
BY S.C. Yuter
ATTORNEY

INVENTOR.
EUGENE LEONARD
BY S.C. Yuter
ATTORNEY.

2,853,559

SIGNAL TRANSFER SELECTOR

Eugene Leonard, Elmhurst, N. Y., assignor to Underwood Corporation, New York, N. Y., a corporation of Delaware Application May 3, 1954, Serial No. 427,037

12 Claims. (Cl. 179—100.2)

This invention relates to signal transfer systems, and more particularly to a selector for choosing the direction of signal transfer in a system.

In signal transfer systems it is often necessary to selectively connect a signal source or a signal receptor to a common input-output device. For example, in magnetic recording systems, recording and reproducing functions are usually accomplished by selectively connecting the recording unit to the recording and reproducing head during a recording operation and by selectively connecting the recording and reproducing head to the reproducing unit during a reproducing operation. A magnetizable record medium passes beneath the recording and reproducing head and signals are either recorded in or reproduced from the magnetizable record medium according to the selected function.

Another example in which a signal transfer selector is necessary is in communication systems which use a single antenna for transmission and reception functions. In such systems, transmission and reception operations are usually accomplished by selectively connecting the transmitting apparatus to the antenna during a transmission operation and by selectively connecting the antenna to the receiving apparatus during a reception operation.

Generally, electro-mechanical relays have been used as the signal transfer selector. However, such relays are found to be unsuitable when high-speed operation is required due to mechanical limitations in operating time and failure after extended periods of operation.

Accordingly, it is an object of this invention to rapidly and reliably select predetermined signal transfer operations.

Another object of the invention is to provide an improved electronic selector for a signal transfer system.

A further object of the invention is to rapidly and reliably select a magnetic recording or reproducing operation.

A still further object of the invention is to rapidly and reliably select a transmission or reception operation.

The signal transfer selector, according to the invention, comprises a pair of vacuum tubes, preferably triodes, an input-output coupling means coupled to the cathodes of the vacuum tubes, an input coupling means coupled to the grids of the tubes, an output coupling means coupled to the anodes of the vacuum tubes, and a control means coupled to the output coupling means for rendering the output coupling means ineffective for passing signals during a signal transfer from the input coupling means to the input-output coupling means.

The tubes operate as cathode followers during the transfer of a signal from the input coupling means to the input-output coupling means and operate as cathode-fed amplifiers during the transfer of a signal from the input-output coupling means to the output coupling means.

The invention, including other objects, features and advantages, will be best understood by referring now to the detailed description, taken in connection with the accompanying drawings, in which.

*Detailed description*

Figures 1, 4:
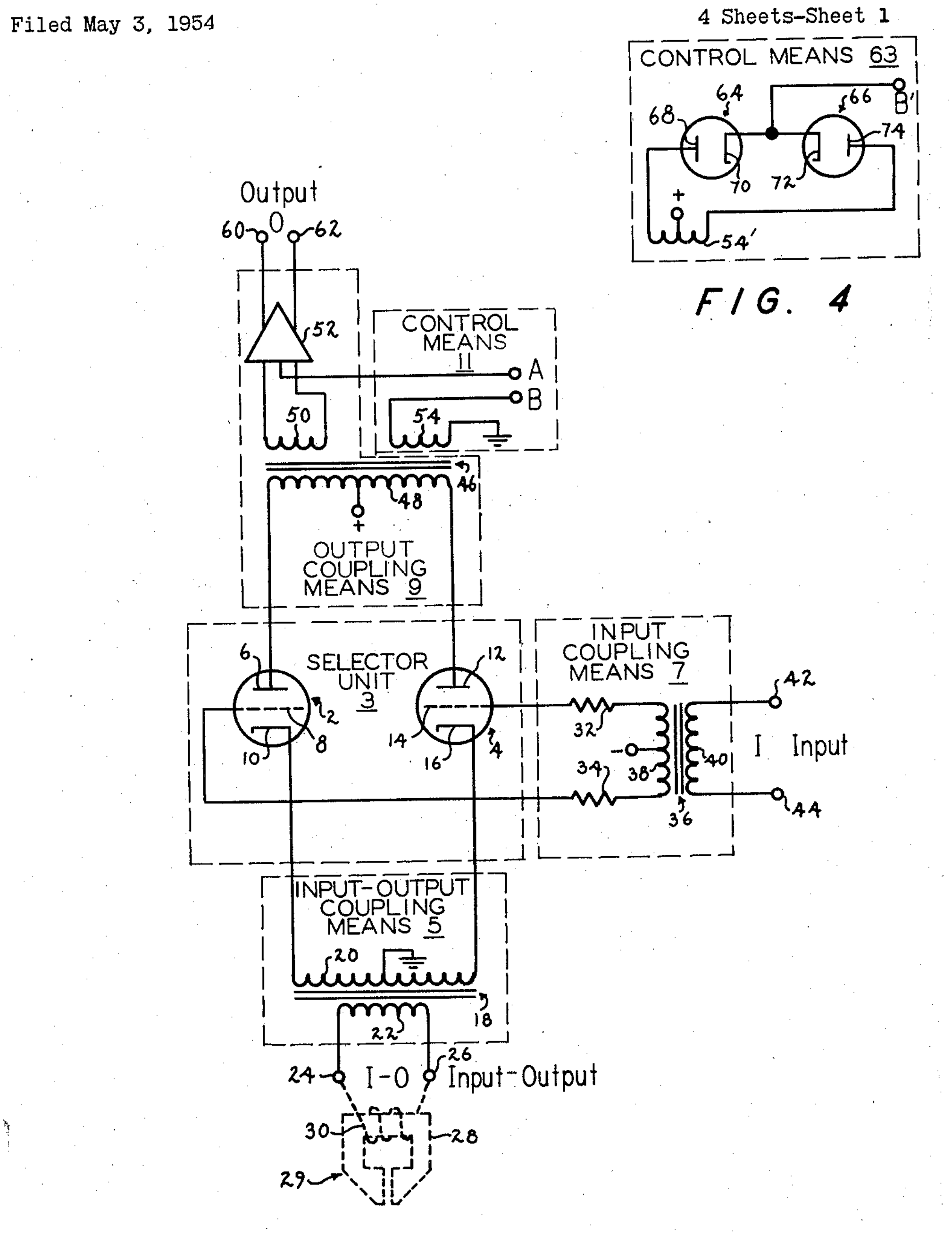
Fig. 1 is a diagram showing schematically a first embodiment of the signal transfer selector.
Fig. 4 is a schematic diagram of a modification of the control means of the signal transfer selector, the signal transfer selector with such modification being understood to be a second embodiment of the signal transfer selector.

Referring to Fig. 1, the signal transfer selector comprises the selector unit 3, the input-output coupling means 5, the input coupling means 7, the output coupling means 9, and the control means 11.

The selector unit 3 is composed of a pair of triodes 2 and 4. The cathodes 10 and 16 of the respective triodes 2 and 4 are connected to the input-output coupling means 5. More particularly, the cathodes 10 and 16 are connected to opposite ends of the primary winding 20 of the iron core transformer 18. The primary winding 20 has a center tap which is connected to ground. The secondary winding 22 of the iron core transformer 18 is connected to the input-output terminals 24 and 26.

The grids 8 and 14 of the respective triodes 2 and 4 are connected to the input coupling means 7. More particularly, the grids 8 and 14 are connected via resistors 32 and 34 to opposite ends of the secondary winding 38 of the iron core transformer 36. The secondary winding 38 has a center tap connected to a negative voltage supply which operates as a bias on the grids 8 and 14 of the respective triodes 2 and 4. The primary winding 40 of the iron core transformer 36 is connected to the input terminals 42 and 44.

The anodes 6 and 12 of the respective triodes 2 and 4 are connected to the output coupling means 9. More particularly, the anodes 6 and 12 are connected to opposite ends of the primary winding 48 of the iron core transformer 46. The primary winding 48 has a center tap which is connected to a positive voltage supply. The secondary winding 50 of the iron core transformer 46 is connected to an amplifier 52. The output of the amplifier 52 is connected to the output terminals 60 and 62.

The control means 11 includes the secondary winding 54 of the iron core transformer 46 which is connected between ground and the control terminal B and the bias control terminal A connected to the grid (not shown) of the amplifier 52.

In operation, the signal transfer selector is capable of selecting either a first signal transfer in which an input signal applied to the input terminals 42 and 44 is transferred to the input-output terminals 24 and 26 or a second signal transfer in which an input signal applied to the input-output terminals 24 and 26 is transferred to the output terminals 60 and 62. It should be noted that the signal transfer selector has a push-pull arrangement for either signal transfer so as to obtain a greater power output, and/or to preserve balance of the system.

The signal transfer selector has a number of applications and, by way of example, its operation will be described with reference to the recording and reproducing of information signals. Thus, a recording and reproducing head 29 (shown in dotted outline), composed of a magnet core 28 having a pair of confronting pole pieces and a coil 30 encircling the core portion, is connected to the input-output terminals 24 and 26.

During a recording operation a negative signal (see A, Fig. 2) is initially applied via the bias control terminal A to the grid of the amplifier 52. This negative signal negatively biases the grid of amplifier 52 and prevents any signals (see O, Fig. 2) from passing to the output terminals 60 and 62. Next, a D.-C. control signal (see B, Fig. 2) is applied to the control terminal B having a magnitude sufficient to saturate the core of the transformer 46 and thereby reduce the permeability of the core to a small value. Of course, the initial surge of current in the secondary 54 causes a small voltage to be induced in the secondary 50, but since the amplifier 52 is sufficiently biased the induced signal does not pass through the amplifier 52.

The control signals A and B will in high speed apparatus, be derived from an electronic control system and may change from one voltage to another in an extremely short time, a switching time in the range of 3 to 10 microseconds being present in some electronic computers. An electromagnetic relay system obviously could not operate with an equal speed and would slow down the over-all operation of a system. The presently disclosed structure is not limited by the speed of operation of mechanical parts and has a switching time of the same magnitude as the operating speed of the control system.

If an alternating magnetizing force, due to an A.-C. signal being applied to the primary winding 48, is superimposed upon the D.-C. magnetizing force the permeability remains the same, due to the saturation of the core of transformer 46, and no signal is induced in the secondary winding 50. Further, saturating the core of the transformer 46 effectively minimizes the impedance of the primary winding 48 and, accordingly, causes the triodes 2 and 4 to operate as cathode followers.

Figure 2:
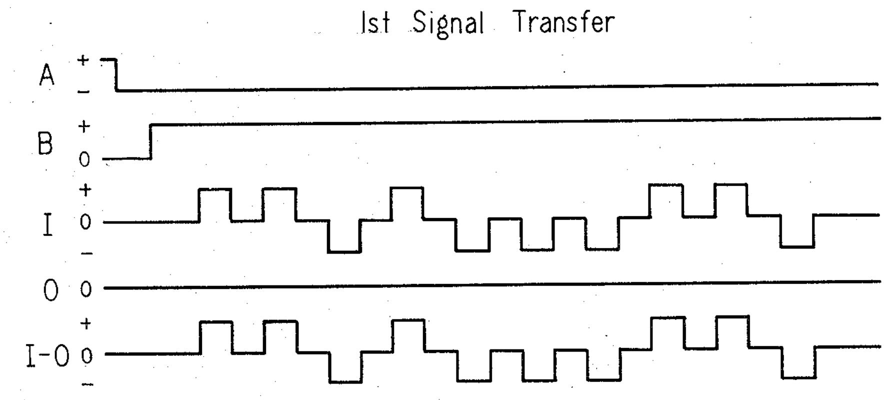
Fig. 2 is a set of curves depicting the waveforms at various points of the first embodiment of the signal transfer selector during a first signal transfer.

An information signal I at the input terminals 42 and 44 (see I, Fig. 2) is now applied via the input coupling means 7 to the grids 8 and 14 of the respective triodes 2 and 4 now operating effectively as cathode followers. The signals developed across the cathode impedances, namely, primary winding 20 of the transformer 18, are applied via the secondary winding 22 to the coil 30 encircling the core 28 of the recording and reproducing head 29 causing the information signal (see I—O, Fig. 2) to be recorded in a magnetic recording medium (not shown). The signals appearing at various points of the signal transfer selector of Fig. 1 during a recording operation are shown in Fig. 2.

Figure 3:
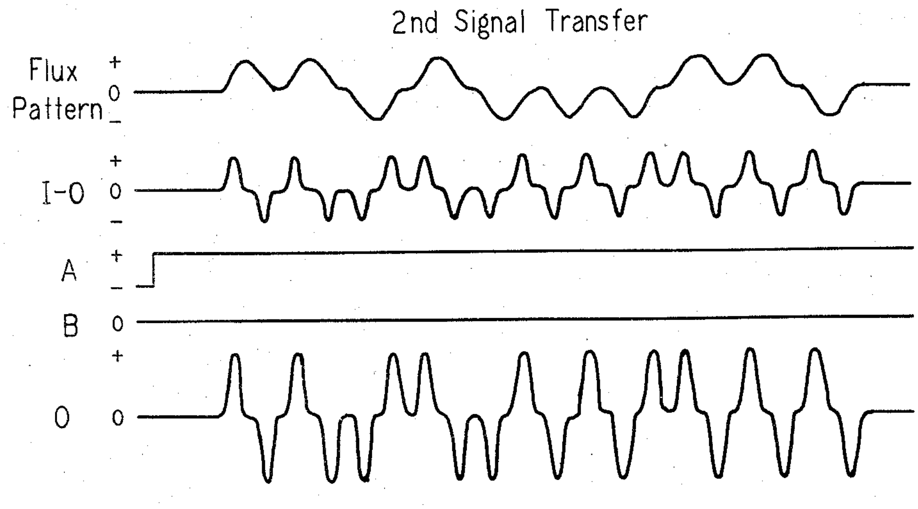
Fig. 3 is a set of curves depicting the waveforms at various points of the first embodiment of the signal transfer selector during a second signal transfer.

During a reproducing operation, no control signal (see B, Fig. 3) is applied to the control terminal B, but the bias on the grid of amplifier 52 is changed (see A, Fig. 3) to permit the amplifier 52 to pass signals, induced in the secondary 50, to the output terminals 60 and 62. A negative voltage at the center tap of the primary winding 38 of the transformer 36 negatively biases the grids 8 and 14 of the respective triodes 2 and 4 and the input signals are applied to the cathodes 10 and 16 of the respective triodes 2 and 4, thereby causing the triodes 2 and 4 to operate as cathode fed amplifiers.

The record medium (not shown) in which information is stored is then passed beneath the recording and reproducing head 29. The recording and reproducing head 29 senses the flux pattern (see Fig. 3) in the record medium and induces a corresponding signal (see I—O, Fig. 3) in the coil 30 of the recording and reproducing head 29. Through normal transformer action, the signal is applied to the cathodes 10 and 16 of triodes 2 and 4. The signal is amplified and by the push-pull arrangement is applied to the secondary winding 50 of the transformer 46. The amplifier 52 now being properly biased passes the signal (see O, Fig. 3) to the output terminals 60 and 62. Thus, an electronic signal transfer selector is provided capable of rapidly and reliably selecting a recording or reproducing operation.

Referring now to Fig. 4 which shows a modification of the control means 11 usable with the signal transfer selector in accordance with a second embodiment of the invention wherein the circuitry is similar to that of Fig. 1 except for the means for controlling the selection of a first or second signal transfer.

The control means 63 shown in Fig. 4 includes a pair of diodes 64 and 66 connected in parallel with the secondary winding 54′. The secondary winding 54′ has a center tap which is connected to a positive voltage supply.

The anodes 68 and 74 of the respective diodes 64 and 66 are connected to opposite ends of the secondary winding 54′. The cathodes 70 and 72 of the respective diodes 64 and 66 are jointly connected to the control terminal B′.

In operation, during the first signal transfer in which an input signal applied to the input terminals 42 and 44 is transferred to the input-output terminals 24 and 26, a positive signal (less positive than that existing at the center tap of the secondary winding 54′) is applied via the control terminal B′ to the cathodes 70 and 72 of the respective diodes 64 and 66. Since the cathodes 70 and 72 are less positive than the anodes 68 and 74 of the respective diodes 64 and 66 both diodes 64 and 66 conduct and effectively apply a short circuit across the secondary winding 54′. Inasmuch as the secondary winding 54′ is effectively short-circuited the input impedance of the transformer 46 has effectively a very small value. Consequently, if an A.-C. signal is applied to the primary winding 48 a very small signal will be induced in the secondary winding 50 of the transformer 46. Since the amplifier 52 is sufficiently biased to prevent signals from passing therethrough no signal will be applied to the output terminals 60 and 62. Further, by effectively reducing the input impedance of the transformer 46 control means 63 causes the triodes 2 and 4 to operate as cathode followers. During the second signal transfer in which an input signal applied to the input-output terminals 24 and 26 is transferred to the output terminals 60 and 62 a positive signal (having a magnitude greater than that existing at the center tap of the secondary winding 54′) is applied to the control terminal B′ to cut off the diodes 64 and 66. This effectively removes the short circuit across the secondary winding 54′ and permits transformer 46 to operate in normal fashion in transferring signals to the amplifier 52.

Figures 5, 6:
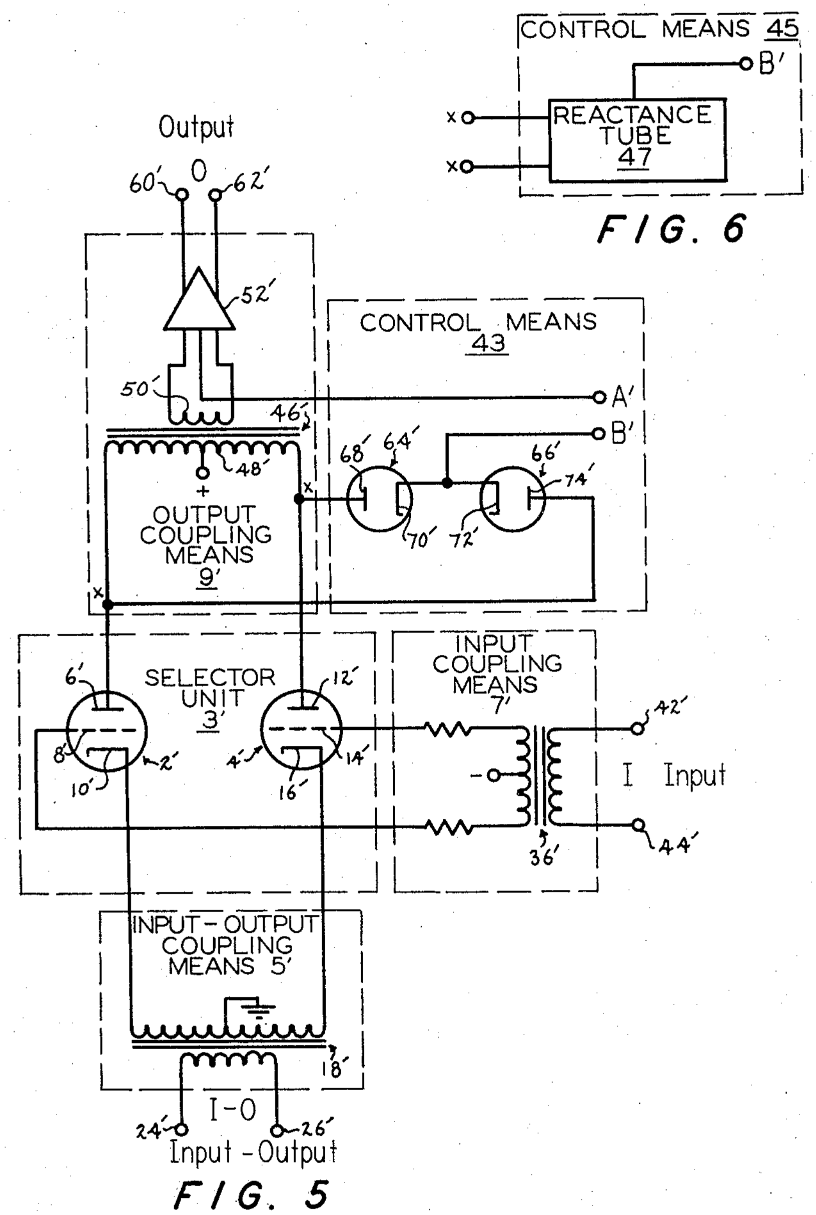
Fig. 5 is a diagram showing schematically a third embodiment of the signal transfer selector.
Fig. 6 is a schematic diagram of a modification of the control means of the third embodiment of the signal transfer selector, the signal transfer selector with such modification being understood to be a fourth embodiment of the signal transfer selector.

Referring now to Fig. 5 which shows the signal transfer selector in accordance with the third embodiment of the invention wherein the circuitry is similar to that of Fig. 1 except for the means for controlling the selection of a first or second signal transfer. The control means 43 shown in Fig. 5 is similar to that of Fig. 4 except that the diodes 64′ and 66′ are now connected across the primary winding 48′ of the transformer 46′. With this arrangement the secondary winding 54 is eliminated. The control means 43 includes a pair of diodes 64′ and 66′ connected in parallel with the primary winding 48′ of the transformer 46′. The anodes 68′ and 74′ of the respective diodes 64′ and 66′ are connected to opposite ends of the primary winding 48′. The cathodes 70′ and 72′ of the respective diodes 64′ and 66′ are jointly connected to the control terminal B′.

In operation, during the first signal transfer in which an input signal applied to the input terminals 42′ and 44′ is transferred to the input-output terminals 24′ and 26′, a positive signal (less positive than that existing at the center tap of the primary winding 48') is applied via the control terminal B' to the cathodes 70' and 72' of the respective diodes 64' and 66'. Since the cathodes 70' and 72' are less positive than the anodes 68' and 74' of the respective diodes 64' and 66' both diodes 64' and 66' conduct and effectively reduce the input impedance of the transformer 46' to a very small value. Consequently, when an A.-C. signal is applied to the primary winding 48' a very small signal will be induced in the secondary winding 50' of the transformer 46'. Since the amplifier 52' is sufficiently biased to prevent signals from passing therethrough no signal will be applied to the output terminals 60' and 62'. Further, by effectively reducing the input impedance of the transformer 46' it causes the triodes 2' and 4' to operate as cathode followers.

During the second signal transfer in which an input signal applied to the input-output terminals 24' and 26' is transferred to the output terminals 60' and 62', a positive signal (having a magnitude greater than that existing at the center tap of the primary winding 48') is applied to the control terminal B' to cut off the diodes 64' and 66', thereby permitting transformer 46' to operate in normal fashion in transferring signals to the amplifier 52'.

Referring now to Fig. 6 which shows a modification of the control means 43 usable with the signal transfer selector in accordance with a fourth embodiment of the invention wherein the circuitry is similar to that of Fig. 5 except for the means for controlling the selection of a first or second signal transfer. The control means 45 shown in Fig. 6 includes a reactance tube circuit 47 of known-type and is connected across the primary winding 48' of the transformer 46'. Reactance tube circuits have the property of varying the impedance of the load connected in parallel therewith by varying the magnitude and phase of the grid voltage of the reactance tube. Consequently, during the first signal transfer the grid voltage of the reactance tube circuit 47 can be adjusted to such a value that the reflected impedance across the primary winding 48' is at a minimum while during the second signal transfer the grid voltage of the reactance tube circuit 47 can be adjusted to a value such that the reactance tube circuit 47 will have no effect on the impedance of the primary winding 48' of the transformer 46'. This embodiment of the signal transfer selector is capable of being used at high frequencies and consequently, the transformers 18', 36' and 46' may be of the air core type.

Figure 7:
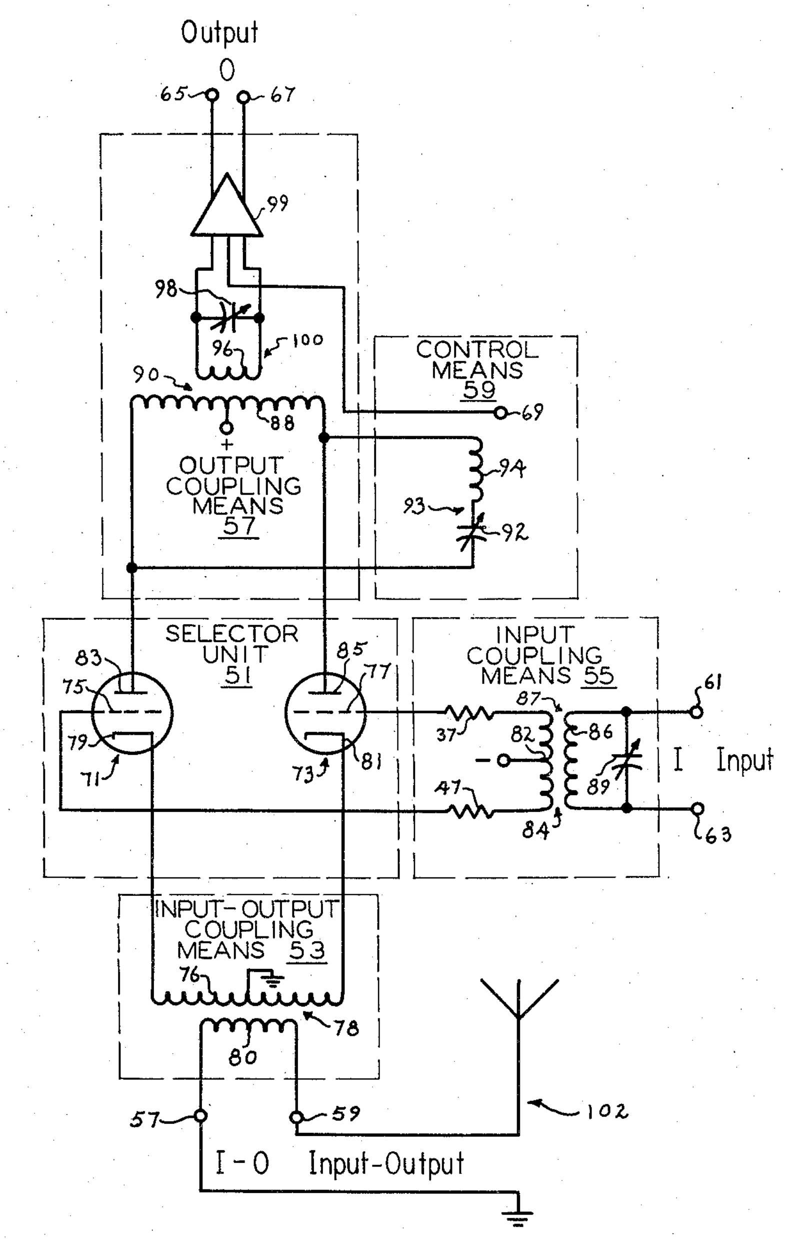
Fig. 7 is a diagram illustrating schematically a fifth embodiment of the signal transfer selector.

Referring now to Fig. 7 which shows the signal transfer selector in accordance with a fifth embodiment of the invention which, by way of example, may be used in a transmit and receive system in which an antenna 102 may be connected to the input-output terminals 57 and 59.

The signal transfer selector includes a selector unit 51 which is composed of a pair of triodes 71 and 73. The cathodes 79 and 81 of the respective triodes 71 and 73 are connected to the input-output coupling means 53. More particularly, the cathodes 79 and 81 are connected to opposite ends of the primary winding 76 of the air core transformer 78. The primary winding 76 has a center tap which is connected to ground. The secondary winding 80 of the air core transformer 78 is connected to the input-output terminals 57 and 59.

The grids 75 and 77 of the respective triodes 71 and 73 are connected to the input coupling means 55. More particularly, the grids 75 and 77 are connected via resistors 37 and 47 to opposite ends of the secondary winding 82 of the air core transformer 84. The secondary winding 82 has a center tap connected to a negative voltage supply which operates as a bias on the grids 75 and 77 of the respective triodes 71 and 73. The primary winding 86 of the air core transformer 84 is connected to the input terminals 61 and 63. A variable capacitor 89 is connected in parallel with the primary winding 86 to form a parallel tuned circuit 87.

The anodes 83 and 85 of the respective triodes 71 and 73 are connected to the output coupling means 57. More particularly, the anodes 83 and 85 are connected to opposite ends of the primary winding 88 of the air core transformer 90. The primary winding 88 has a center tap connected to a positive voltage supply. The secondary winding 96 of the transformer 90 is connected to the amplifier 99. A variable capacitor 98 is connected in parallel with the secondary winding 96 to form a parallel tuned circuit 100. The output of the amplifier 99 is connected to the output terminals 65 and 67.

The control means 59 includes a series tuned circuit 93 having a variable capacitor 92 and inductor 94 connected in parallel with the primary winding 88 of the transformer 90 and the bias control terminal 69 connected to the grid (not shown) of the amplifier 99.

In operation, the signal transfer selector is capable of selecting either a signal transmission in which an input signal $f_1$ applied to the input terminals 61 and 63 is to be transferred via the input-output terminals 57 and 59 to the antenna 102 or a signal reception in which an input signal $f_2$ received at the input-output terminals 57 and 59 from the antenna 102 is to be transferred to the output terminals 65 and 67.

The first parallel tuned circuit 87 and the series tuned circuit 93 are tuned to the frequency $f_1$ while the second parallel tuned circuit 100 is tuned to the frequency $f_2$. Inasmuch as a series tuned circuit has a minimum of impedance at its resonant frequency a short circuit effectively exists across the primary winding 88 of the air core transformer 90 when a signal having a frequency $f_1$ is applied thereto.

During a signal transmission a negative signal is initially applied via bias control terminal 69 to the grid of the amplifier 99. This negative signal sufficiently biases the grid of the amplifier 99 to prevent any signal from passing to the output terminals 65 and 67. The signal $f_1$ to be transmitted to the antenna is applied at the input terminals 61 and 63. The air core transformer 84 responds to the signal $f_1$ via the parallel tuned circuit 87 and applies the signal $f_1$ to the grids 75 and 77 of the respective triodes 71 and 73. Inasmuch as a virtual short circuit exists across the primary winding 88 of the air core transformer 90 when the signal $f_1$ is applied thereto, the anodes 83 and 85 of the respective triodes 71 and 73 are effectively connected to the positive voltage supply at the center tap of the primary winding 88. Consequently, the triodes 71 and 73 operate as cathode followers. The signals developed across the cathode impedances, namely, the primary winding 76 of the air core transformer 78, are applied via the secondary winding 80 and the input-output terminals 57 and 59 to the antenna 102 for transmission.

During a signal reception the primary winding 88 of the air core transformer 90 is no longer effectively short circuited as the signal transfer selector is now responsive to a signal having a frequency $f_2$ and the series tuned circuit 100 is effectively de-tuned. The bias on the grid of the amplifier 99 is changed to permit the amplifier 99 to pass signals, induced in the secondary winding 96 of the transformer 90, to the output terminals 65 and 67. A negative voltage at the center tap of the secondary winding 82 of the transformer 84 negatively biases the grids 75 and 77 of the respective triodes 71 and 73 and the input signals received from the antenna 102 are applied to the cathodes 79 and 81 of the respective triodes 71 and 73 thereby causing the triodes 71 and 73 to effectively operate as cathode fed amplifiers.

The antenna 102 upon receiving the signal having a frequency $f_2$ applies it via transformer 78 to the cathodes 79 and 81 of the triodes 71 and 73. The signals are amplified and by the push-pull arrangement are applied via the parallel tuned circuit 100 (tuned to frequency $f_2$)

to the amplifier 99. Inasmuch as the amplifier 99 is now conditioned to pass signals it will pass the signals having the frequency $f_2$ to the output terminals 65 and 67.

Thus, the invention provides an improved signal selection system which is capable of rapidly and reliably selecting a predetermined signal transfer.

With the present invention a selection may be made in the order of three microseconds whereas with an electromechanical selector, such as a relay, the selection may be in the order of three milliseconds. Hence, the electronic signal transfer selector is suitable when high speed operation is required.

While only a few embodiments of the invention have been described above, it is to be understood that many modifications and variations can be made accomplishing the foregoing objects and realizing all of the advantages without departing from the spirit of the invention.

What is claimed is:

1. A signal transfer selector comprising a pair of triode tubes, an input coupling means coupled to the grids of said pair of triode tubes, an input-output coupling means coupled to the cathodes of said pair of triode tubes, an output coupling means coupled to the anodes of said pair of triode tubes, and control means connected to said output coupling means, said pair of triode tubes being responsive to said control means to transfer a signal from said input coupling means via said pair of triode tubes to said input-output coupling means or to transfer a signal from said input-output coupling means via said pair of triode tubes to said output coupling means, said control means rendering said output coupling means ineffective for passing a signal during the transfer of a signal from said input coupling means.

2. A signal transfer selector comprising a pair of triode tubes, an input coupling means including an input transformer coupled to the grids of said pair of triode tubes, an input-output transformer coupled to the cathodes of said pair of triode tubes, an output coupling means including an output transformer coupled to the anodes of said pair of triode tubes, and control means coupled to said output coupling means, said pair of triode tubes being responsive to said control means during a first signal transfer for transferring a signal from said input coupling means via said pair of triode tubes to said input-output transformer and during a second signal transfer for transferring a signal from said input-output transformer via said pair of triode tubes to said output coupling means, said control means rendering said output transformer ineffective for passing a signal during the first signal transfer.

3. A signal transfer selector comprising a selector unit, an input coupling means coupled to said selector unit, an input-output coupling means coupled to said selector unit, an output means, a transformer coupling said selector unit to said output means, and control means coupled to said selector unit, said selector unit being responsive to said control means during a first signal transfer for transferring a signal from said input coupling means via said selector unit to said input-output coupling means and during a second signal transfer for transferring a signal from said input-output coupling means via said selector unit to said output means via said transformer, said control means rendering said transformer ineffective for passing signals during the first signal transfer.

4. A signal transfer selector comprising a selector unit, an input coupling means including a first transformer coupled to said selector unit, an input-output coupling means including a second transformer coupled to said selector unit, an output coupling means including a third transformer coupled to said selector unit, and control means coupled to said output coupling means, said selector unit being responsive to said control means during a first signal transfer for transferring a signal from said input coupling means via said selector unit to said input-output coupling means and during a second signal transfer for transferring a signal from said input-output coupling means via said selector unit to said output coupling means, said control means rendering said third transformer ineffective for passing signals during the first signal transfer.

5. A signal transfer selector comprising a pair of triode tubes, an input-output coupling means coupled to the cathodes of said triode tubes, an input coupling means coupled to the grids of said triode tubes, an output coupling means coupled to the anodes of said triode tubes, said input coupling means during a first signal transfer transferring a signal to the grids of said triode tubes and during a second signal transfer conditioning said triode tubes to operate as cathode fed amplifiers, and a control means coupled to said output coupling means, said control means during the first signal transfer rendering said output coupling means ineffective for passing signals and conditioning said triode tubes to operate as cathode followers such that said triode tubes, during the first signal transfer, transfer a signal from said input coupling means to said input-output coupling means and, during the second signal transfer, transfer a signal from said input-output coupling means to said output coupling means.

6. A signal transfer selector comprising a selector unit, an input coupling means coupled to said selector unit, an input-output coupling means coupled to said selector unit, an output coupling means including an iron core transformer coupled to said selector unit, and control means coupled to said selector unit, said selector unit being responsive to said control means during a first signal transfer for transferring a signal from said input coupling means to said input-output coupling means and during a second signal transfer for transferring a signal from said input-output coupling means to said output coupling means, said control means saturating said iron core transformer during the first signal transfer thereby rendering said output coupling means ineffective for passing signals.

7. A signal transfer selector comprising a selector unit, an input coupling means coupled to said selector unit, an input-output coupling means coupled to said selector unit, a transformer having a primary winding coupled to said selector unit and a pair of secondary windings, an output means coupled to one of said pair of secondary windings, and control means associated with the other one of said pair of secondary windings, said selector unit being responsive to said control means during a first signal transfer for transferring a signal from said input coupling means to said input-output coupling means and during a second signal transfer for transferring a signal from said input-output coupling means to said output means via said transformer, said control means during the first signal transfer rendering said transformer ineffective for passing signals.

8. A recording and reproducing selector for a magnetic recording system comprising a recording and reproducing head, an electronic selector unit having output, input, and ground terminals, a recording input means coupled to said input terminals of said electronic selector unit, an input-output coupling means coupling said ground terminals of said electronic selector unit to said recording and reproducing head, a reproducing output means coupled to said output terminals of said electronic selector unit, and control means for determining the type of operation of said electronic selector unit said control means decreasing the impedance of said recording output means to render said electronic selector unit effective during a recording operation to transfer a signal from said recording input means to said recording and reproducing head while preventing the signal from passing through said reproducing output means and said control means being effective during a reproducing operation to enable said reproducing output means whereby a signal from said recording and reproducing head will be passed through said reproducing output means.

9. A recording and reproducing selector for a magnetic recording system comprising a recording and reproducing head, a selector unit including an electronic device having at least an anode, a cathode, and a control element, a recording input means coupled to the control element of the electronic device of said selector unit, an input-output coupling means coupling said cathode of said electronic device of said selector unit to said recording and reproducing head, a reproducing output means coupled to the anode of said electronic device of said selector unit, said selector unit acting as a cathode follower during a recording operation to transfer a signal from said recording input means to said recording and reproducing head and acting as a cathode fed amplifier during a reproducing operation to transfer a signal from said recording and reproducing head to said reproducing output means, and a control means coupled to said reproducing output means to decrease the impedance of said reproducing output means to improve the cathode follower output of said selecting means and for rendering said reproducing output means ineffective for passing signals during a recording operation.

10. A recording and reproducing selector for a magnetic recording system comprising a recording and reproducing head, a pair of triode tubes operable as a cathode follower or a cathode fed amplifier, a recording input means coupled to the grids of said pair of triode tubes, an input-output coupling means coupling the cathodes of said pair of triode tubes to said recording and reproducing head, a reproducing output means coupled to the anodes of said triode tubes, said pair of triode tubes operating as a cathode follower during a recording operation for transferring a signal from said recording input means to said recording and reproducing head and operating as a cathode fed amplifier during a reproducing operation for transferring a signal from said recording and reproducing head to said reproducing output means, and means coupled to said reproducing output means for lowering the imepdance of said reproducing output means to substantially eliminate the anode load of said triodes and thereby improve operation of said tubes as a cathode follower and for rendering said reproducing output means ineffective for passing signals during a recording operation.

11. A recording and reproducing selector for a magnetic recording system comprising a recording and reproducing head, a pair of triode tubes operable as a cathode follower or a cathode fed amplifier, a recording input means coupled to the grids of said pair of triode tubes, an input-output coupling means coupling the cathodes of said pair of triode tubes to said recording and reproducing head, and a reproducing output means coupled to the anodes of said triode tubes, said pair of triode tubes operating as a cathode follower during a recording operation for transferring a signal from said recording input means to said recording and reproducing head and operating as a cathode fed amplifier during a reproducing operation for transferring a signal from said recording and reproducing head to said reproducing output means.

12. A signal transfer selector comprising a selector unit, an input coupling means coupled to said selector unit, an input-output coupling means coupled to said selector unit, a transformer having a primary winding coupled to said selector unit and a pair of secondary windings, an output means coupled to one of said pair of secondary windings, control means associated with the other one of said pair of secondary windings, said selector unit being responsive to said control means during a first type of signal transfer for transferring a signal from said input coupling means and during a second type of signal transfer for transferring a signal from said input-output coupling means to said output means via said transformer, said control means during said first type of signal transfer rendering said transformer ineffective for passing signals, and means for rendering said output means ineffective for passing signals, said means operating prior to operation of said control unit in a first type of signal transfer.

References Cited in the file of this patent

UNITED STATES PATENTS

| | | |
|---|---|---|
| 2,370,166 | Hooven | Feb. 27, 1945 |
| 2,505,655 | Van Weel | Apr. 25, 1949 |
| 2,536,666 | Somers | Jan. 2, 1951 |
| 2,591,484 | Wheeler | Apr. 1, 1952 |
| 2,603,743 | Lawson | July 15, 1952 |
| 2,713,618 | McNabb | July 19, 1955 |